United States Patent [19]
Brzozowski et al.

[11] 3,887,522
[45] June 3, 1975

[54] SELF-EXTINGUISHING, FILM-FORMING, LINEAR POLYARYLATES
[75] Inventors: Zbigniew Brzozowski; Stanislaw Porejko; Jedrzej Kielkiewicz; Janusz Kaczorowski, all of Warsaw, Poland
[73] Assignee: Politechnika Warszawska, Warsaw, Poland
[22] Filed: May 24, 1974
[21] Appl. No.: 473,322

Related U.S. Application Data
[63] Continuation-in-part of Ser. No. 331,247, Feb. 9, 1973, abandoned.

[52] U.S. Cl. ....... 260/47 C; 117/161 K; 204/159.14; 260/33.8 R; 260/61
[51] Int. Cl. ............................................. C08g 17/08
[58] Field of Search ............................ 260/47 C, 61

[56] References Cited
UNITED STATES PATENTS
3,351,611  11/1967  Conix.................................... 260/47
3,351,624  11/1967  Conix.................................... 260/47

Primary Examiner—Lester L. Lee
Attorney, Agent, or Firm—Waters, Schwartz & Nissen

[57] ABSTRACT

Self-extinguishing, film-forming, linear polyarylates are prepared by interfacial polycondensation of chlorobisphenols, at least one of which contains a carbon atom, between two aryl rings, which is connected by a double bond to a $-CCl_2$ group, or a mixture of these chlorobisphenols with bis (hydroxyaryl) alkanes, and dicarboxylic acid chlorides or mixtures thereof in the presence of quaternary salts of an ammonium or phosphonium base. The polyarylates have very good film-forming properties and a high thermostability up to 360°C.

The self-sustaining films and coatings have very good dielectric properties such as dielectric loss factor, resistivity and dielectric strength, exhibit non-inflammability, good transparency, smoothness of surface and elasticity, and do not require additional plasticization.

14 Claims, No Drawings

SELF-EXTINGUISHING, FILM-FORMING, LINEAR POLYARYLATES

This application is a continuation-in-part of Ser. No. 331,247, filed Feb. 9, 1973, now abandoned.

This invention relates to a process for the manufacture of self-extinguishing polyarylates used for producing of films and coatings exhibiting very good mechanical and dielectric properties.

BACKGROUND OF THE INVENTION

The known methods of obtaining polyarylates comprise the interfacial polycondensation of aromatic dicarboxylic acids or their halides with bisphenols. The dicarboxylic acids used include terephthalic, isophthalic, orthophthalic acids or mixtures thereof. Examples of the bisphenol components are 1,1-(4,4'-dihydroxydiphenyl)-cyclohexane; 1-phenyl-1,1-(4,4'-dihydroxydiphenyl)methane; 1-phenyl-1,1-(4,4'-dihydroxydiphenyl)ethane; 4,4'-dihydroxydiphenyl sulfone, 2,2-(4,4'-dihydroxy-3,3'-dimethyldiphenyl)propane; 1,1,1-trichloro-2,2-(4,4'-dihydroxydiphenyl)ethane, 2,2-(4,4'-dihydroxydiphenyl)propane; 2,2-(4,4'-dihydroxydiphenyl)-1,1-dimethylpropane; 3,3-(4,4'-dihydroxydiphenyl)heptane; 1,1-(4,4'-dihydroxydiphenyl) propane; 1,1- or 2,2-(4,4'-dihydroxydiphenyl)butane; 1,1- , 2,2- or 3,3- (4,4'-dihydroxydiphenyl)pentane; 1,1-diphenyl-1,1-(4,4'-dihydroxydiphenyl)methane; 2,2-(3,3'-dihydroxydiphenyl)propane; and 2,2-(3,3'-dihydroxydiphenyl)-1,1-dimethylpropane.

However, only some of the above listed bisphenols can give polymers exhibiting self-extinguishing properties but they are not thermally stable. The method for obtaining such polymers is described in U.S. Pat. No. 3,351,611 and in U.S. Pat. No. 3,351,624. Such polymers are obtained from 1,1,1-trichloro-2,2-(4,4'-dihydroxydiphenyl)ethane having

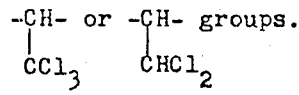

The polymers obtained from the other bisphenols mentioned in th cited Patents have no self-extinguishing properties. Moreover, none of the bisphenols listed in the cited patents have a double bond in the aliphatic moiety, so that the polymers obtained from them can not be modified by heating or by exposure to infrared, ultraviolet or gamma ray radiation. Such a possibility for modification is mentioned in U.S. Pat. No. 3,351,611, but it can be accomplished only by introducing fumaroyl chloride into the reaction mixture, and this increases the overall cost of the polymer, complicates the process of obtaining the polymer and disadvantageously affects the molecular weight of the polymer. The molecular weight can be increased by introducing into the reaction mixture some surface-active agents, but such additives cause a worsening of the dielectric properties of the films and coatings formed from such polymers. Films and coatings obtained from polymers having low molecular weight are brittle and it is necessary to utilize additional plasticization, but this operation decreases the transparency and dielectric properties.

Moreover, films and coatings obtained from the polymers prepared by the known methods are not chemically resistant, especially against chlorinated aliphatic hydrocarbons.

SUMMARY OF THE INVENTION

The object of this invention is to provide self-extinguishing, film-forming, heat-resistant polyarylates which may be prepared by a process which is technologically simple and consequently allows the process to be carried out at room temperature, without adding an emulsifier which would undesireably lower the electro-insulating properties of the final product.

It has been found that self-extinguishing, thermally stable, high molecular weight polyarylates from which films and coatings of different thicknesses can be produced, are obtainable by means of the interfacial polycondensation reaction of chlorobisphenols or their mixture with bis(hydroxyaryl)alkanes and aryl dicarboxylic acid chlorides or of their mixtures, at least one of these chlorobisphenols having the formula:

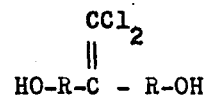

wherein each R is selected from the group consisting of phenyl and naphthyl and which may contain substituents selected from halogen and lower alkyl.

Particularly useful are chlorobisphenols having the formula:

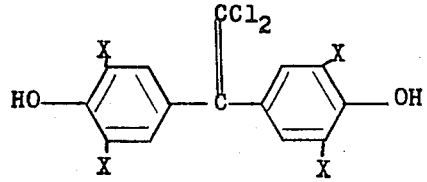

wherein each X is selected from the group consisting of hydrogen, halogen and lower alkyl. These are characterized by having a group in which the carbon atom between two aryl rings is connected by a double bond to a $CCl_2$ group.

Owing to the presence of the

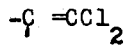

group, the linear polyarylates of the present invention may be cross-linked to form insoluble polyarylates by heating or by exposure to infrared, ultaviolet or gamma ray radiation.

The linear polyarylates of the present invention have a molecular weight of the order of 100,000–350,000 and a reduced viscosity of about 1.0–2.5 when measured in tetrachloroethane.

DESCRIPTION OF PREFERRED EMBODIMENTS

Examples of chlorobisphenols containing the group in which the carbon atom between two aryl rings is connected by a double bond to a $-CCl_2$ group, according to the invention include e.g. 2,2-bis (4-hydroxyphenyl)-1,1-dichloroethylene; 2,2-bis(4-hydroxy-3,5-dichlorophenyl)-1,1-dichloroethylene; 2,2-bis(3-methyl-4-hydroxyphenyl)-1,1- dichloroethylene and 2,2-bis(2-hydroxy-1-naphthyl)-1,1-dichloroethylene.

In the method according to the present invention, examples of the bis(hydroxyaryl)alkanes include those disclosed in U.S. Pat. No. 3,351,611 and U.S. Pat. No. 3,351,624 e.g. bis(hydroxyphenyl)alkanes, preferably 2,2-bis(4-hydroxyphenyl) propane and also bis(hydroxynaphthyl) alkanes, preferably bis(2-hydroxy-1-naphthyl)methane or phenolphthaleins or anthrahydroquinones. The mole-ratio of the bis(hydroxyaryl) alkanes to the chlorobisphenols in the reaction mixture is 2:1 to 1:8.

The aryl dicarboxylic acid chlorides are preferably phthalic acid chlorides, most preferably a mixture of terephthalic acid chloride and isophthalic acid chloride, preferably taken in a weight ratio of 4:1 to 1:1.

The polycondensation reaction is carried out in the presence of salts of quaternary ammonium or phosphonium bases, with simultaneous stirring, the ratio of the organic phase to the inorganic phase being 1:2 to 1:4 by volume. Typical suitable salts include the chlorides or sulfates of quaternary ammonium or phosphonium bases substituted with lower alkyl, phenyl and/or benzyl groups.

The polyarylates obtained according to the invention have a high molecular weight and owing to this fact that they are distinguished by a very high thermostability reaching 360°C., and films and coatings produced therefrom exhibit very good dielectric properties, such as dielectric loss factor, resistivity and dielectric strength.

The production of coatings and self-sustaining films from the polyarylates obtained according to the invention is also simple and consists in pouring out a solution of the polyarylate in a readily available solvent such as methylene chloride or tetrachloroethane and allowing the solvent to evaporate.

These films and coatings have good transparency and smoothness of surface and do not require additional plasticization.

The object of this invention is more fully explained in the following examples which, however, do not limit the scope and range of the invention.

EXAMPLE I

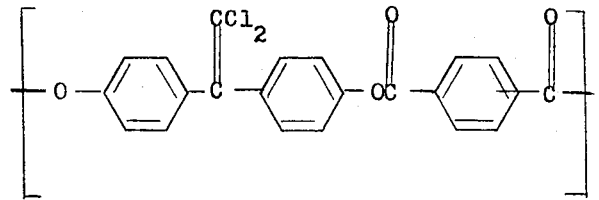

2 g of sodium hydroxide was dissolved in 100 ml of distilled water and to this solution was added gradually 5.62 g of 2,2-bis (4-hydroxyphenyl)-1,1-dichloroethylene. The chlorobisphenolate solution obtained was placed in a flask, adding as the catalyst a solution of 0.55 g of benzyltriethylammonium chloride in 70 ml of distilled water. While intensively stirring at room temperature there was added dropwise during 15 minutes a solution of 3 g of terephthalic acid chloride and 1 g of isophthalic acid chloride in 50 ml of methylene chloride. After stirring for 3 hours, an additional 200 ml of methylene chloride was added and the stirring was continued for another 30 minutes. Thereafter the solution was acidified to pH=1, whereupon stirring was continued for 30 minutes and the mixture was placed in a separator to separate the organic layer from the water layer. The separated layer was washed twice with 100 ml portions of distilled water. The washed material was poured in a thin stream into 600 ml of strongly cooled methanol with stirring. The precipitated flocky deposit was filtered and washed with pure methanol. The product was dried in air and then in a vacuum drier. The polymer obtained had a molecular weight of the order of 200,000 and the reduced viscosity measured in tetrachloroethane was $\eta$ red. = 1.23. The film poured out from a solution of the polymer in a mixture of methylene chloride and tetrachloroethane had a high thermal resistance amounting to 360°C determined by differential thermal analysis. The tensile strength of the films produced from this polymer determined on a tensile testing machine of the Schoper type at a rate of travel of 50mm/min was 900 kg/cm$^2$, the relative elongation being 15%. The dielectric loss factor of these films at 1 kH was $-7.10^{-4}$ at 20°C and $-12.10^{-4}$ at 180°C. The resistivity at 25°C was $2.5 \cdot 10^{17}$ ohm. cm.

EXAMPLE II

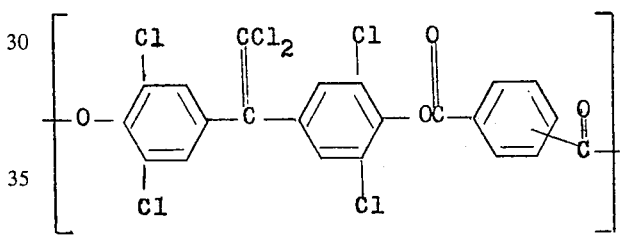

The reaction was carried out as in Example I, but instead of 5.62 g of 2,2-bis(4-hydroxyphenyl)-1,1-dichloroethylene there was used 8.38 g of 2,2-bis(3,5,-dichloro-4-hydroxyphenyl)-1,1-dichloroethylene.

EXAMPLE III 2 g of sodium hydroxide was dissolved in 100 ml of distilled water and treated gradually with 2.81 g of 2,2-bis(4-hydroxyphenyl)-1,1-dichloroethylene and 2.28 g of 2,2-bis(4-hydroxyphenyl)propane. The solution obtained was placed in a flask and as the catalyst, a solution of 0.55 g of benzyltriethylphosphonium chloride in 70 ml of distilled water was added. While intensively stirring at room temperature was added dropwise during a period of 15 minutes a solution of 2 g of terephthalic acid chloride and 2 g of isophthalic acid chloride in 50 ml of methylene chloride. After stirring for 3 hours 200 ml of methylene chloride were added, and stirring was continued for 30 minutes. Thereafter the solution was acidified to pH = 1, whereupon stirring was continued for 30 minutes and the mixture was then placed in a separator in order to separate the organic layer from the water layer. The organic layer was washed several times with distilled water and than it was poured in a thin stream into 500 ml of methanol cooled with dry ice. The precipitated white flocky product was filtered and washed with methanol and than dried in a vacuum drier.

EXAMPLE IV

The procedure was carried out as in Example III, but instead of a mixture of 2,2-bis(hydroxyphenyl)-1,1-dichloroethylene with 2.28 g of 2,2-bis(4-hydroxyphenyl)propane there was used a mixture of 6.2 g of chlorinated 2,2-bis(4-hydroxyphenyl)-1,1-dichloroethylene with 1.14 g of 2,2-bis(4-hydroxyphenyl)propane and instead of benzyltriethylammonium chloride there was used methyltriphenylphosphonium iodide.

EXAMPLE V 2 g of sodium hydroxide was dissolved in 80 ml of distilled water and gradually treated with 2.81 g of 2,2-bis(4-hydroxyphenyl)-1,1-dichloroethylene and 3.0 g of bis(4-hydroxynaphthyl) methane. The solution obtained was placed in a flask and 0.11 g of tetraethylammonium chloride in 90 ml of distilled water was added as a catalyst. Than during the period of 15 minutes there was added dropwise to the intensively stirred solution a mixture of 3 g of terephthalic acid chloride and 1 g of isophthalic acid chloride in 60 ml of methylene chloride. After stirring for 1.5 hours, 250 ml of methylene chloride were added and the stirring then continued for 30 minutes. Thereafter the solution was acidified to pH = 1, whereupon the stirring was continued for 30 minutes and the mixture was than placed into a separator to separate the organic layer from the water layer. The organic layer was washed several times with distilled water and than it was poured in a thin stream into 500 ml of ethanol cooled with dry ice. The precipitate was washed several times with ethanol and than dried in a vacuum drier.

EXAMPLE VI

The procedure was carried out as in Example V, but instead of a mixture of 2.81 g of 2,2-bis(4-hydroxyphenyl)-1,1-dichloroethylene with 3.0 g of bis-(2-hydroxy-1-naphthyl)methane, a mixture of 4.64 g of 2,2-bis(3-methyl-4-hydroxyphenyl)-1,1-dichloroethylene with 1.59 g of 2,2-bis(4-hydroxyphenyl)-1,1,1-trichloroethane and instead of tetraethylammonium chloride as a catalyst 1.2 g of tetramethylammonium bromide was used.

EXAMPLE VII

The procedure was carried out as in Example V, but instead of a mixture of 2.81 g of 2,2-bis(4-hydroxyphenyl)-1,1-dichloroethylene with 3.0 g bis(2-hydroxy-1-naphthyl)methane a mixture of 6.1 g of 2,2-bis(2-hydroxy-1-naphthyl)-1,1-dichloroethylene with 1.2g of bis(2-hydroxy-1-naphthyl)methane and instead of 0.11g of tetraethylammonium chloride 1.5 g of benzyltriphenylphosphonium bromide was added.

We claim:

1. A high molecular weight self-extinguishing, linear polyarylate of a dicarboxylic acid and a bisphenol said dicarboxylic acid consisting essentially of at least one phthalic acid and said bisphenol comprising at least one chlorobisphenol of the formula:

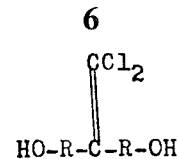

wherein each R is selected from the group consisting of phenyl and naphthyl and which may contain substituents selected from halogen and lower alkyl, said polyarylate being capable of forming a self-sustaining film.

2. A polyarylate according to claim 1 wherein the dicarboxylic acid is a mixture of terephthalic acid and isophthalic acid.

3. A polyarylate according to claim 2 wherein the acids in the mixture are in the weight ratio of 4:1 to 1:1, respectively.

4. A polyarylate according to claim 1 wherein the chlorobisphenol has the formula:

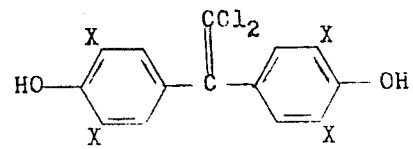

in which X is selected from the group consisting of hydrogen, halogen and lower alkyl.

5. A polyarylate according to claim 4 wherein the chlorobisphenol is 2,2-bis(4-hydroxyphenyl)-1,1-dichloroethylene.

6. A polyarylate according to claim 4 wherein the chlorobiphenol is 2,2-bis(4-hydroxy-3,5-dichlorophenyl)-1,1-dichloroethylene.

7. A polyarylate according to claim 2 wherein the bisphenol additionally comprises a bis(hydroxyaryl) lower alkane.

8. A polyarylate according to claim 7 wherein the bis(hydroxyaryl)lower alkane is selected from the group consisting of bis(hydroxyphenyl)lower alkanes, bis(hydroxynaphthyl)lower alkanes, phenolphthaleins and anthrahydroquinones.

9. A polyarylate according to claim 8 wherein the bis(hydroxyaryl)lower alkane is 2,2-bis(4-hydroxyphenyl)propane.

10. A polyarylate according to claim 8 wherein the bis(hydroxyaryl)lower alkane is bis(2-hydroxy-1-naphthyl)methane.

11. A polyarylate according to claim 8 wherein the bis (hydroxyaryl)lower alkane is 2,2-bis(4-hydroxyphenyl)-1,1,1-trichloroethane.

12. A polyarylate according to claim 9 wherein the chlorobisphenol is 2,2-bis(4-hydroxyphenyl)-1,1-dichloroethylene.

13. A polyarylate according to claim 10 wherein the chlorobisphenol is 2,2-bis(4-hydroxyphenyl)-1,1-dichloroethylene.

14. A polyarylate according to claim 10 wherein the chlorobisphenol is 2,2-bis(2-hydroxy-1-naphthyl)-1,1-dichloroethylene.

* * * * *